(12) United States Patent
Heflin et al.

(10) Patent No.: US 6,652,206 B2
(45) Date of Patent: Nov. 25, 2003

(54) SELF-LOCKING RIVET FASTENER

(75) Inventors: Chad E. Heflin, Manteno, IL (US); George Siragusa, Chicago Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/080,318

(22) Filed: Feb. 20, 2002

(65) Prior Publication Data

US 2003/0156917 A1 Aug. 21, 2003

(51) Int. Cl.[7] ............................ F16B 13/04; F16B 13/06
(52) U.S. Cl. ................... 411/48; 411/60.1; 411/344; 411/908
(58) Field of Search ........................... 411/41, 45, 46, 411/48, 60.1, 340, 344, 908

(56) References Cited

U.S. PATENT DOCUMENTS

| 3,130,822 | A | * | 4/1964 | Meyer .................. 411/45 X |
| 3,350,976 | A | | 11/1967 | Topf |
| 4,312,614 | A | * | 1/1982 | Palmer et al. ............ 411/41 X |
| 4,571,134 | A | * | 2/1986 | Beglinger et al. ............ 411/41 |
| 5,028,187 | A | | 7/1991 | Sato |
| 5,085,545 | A | | 2/1992 | Takahashi |
| 5,201,623 | A | | 4/1993 | Benedetti et al. |
| 5,211,519 | A | | 5/1993 | Saito |
| 5,286,152 | A | | 2/1994 | Anderson |
| 5,366,332 | A | | 11/1994 | Murphy |
| 5,370,484 | A | | 12/1994 | Morikawa et al. |
| 5,632,581 | A | | 5/1997 | Hasada |
| 5,641,255 | A | | 6/1997 | Tanaka |
| 5,775,860 | A | * | 7/1998 | Meyer .................. 411/46 |
| 5,855,347 | A | | 1/1999 | Hollingsworth et al. |
| 6,074,144 | A | | 6/2000 | Meyer |

FOREIGN PATENT DOCUMENTS

EP 0 415 509 A1 6/1991

OTHER PUBLICATIONS

4840523—Jun. 20, 1989—Oshida.
4784550—Nov. 15, 1988—Wollar.
4276806—Jul. 7, 1981—Morel.
3918130—Nov. 11, 1975—Poe.
2941439—Jun. 21, 1960—Rapata.

* cited by examiner

*Primary Examiner*—Neill Wilson
(74) *Attorney, Agent, or Firm*—Mark W. Croll; Paul F. Donovan

(57) ABSTRACT

A rivet-type fastener is disclosed, suitable for panel fasteners and other applications in which retention in a hole is required. The act of inserting the fastener expands fastener arms to secure the fastener in the hole, and positions locking protrusions of a post within notches of the arms, to lock the fastener within the hole. In some embodiments the fastener can be released, for removal and re-use.

20 Claims, 3 Drawing Sheets

SELF-LOCKING RIVET FASTENER

FIELD OF THE INVENTION

The present invention pertains generally to rivet type fasteners for attachment in holes of work pieces; and more particularly, to self-locking rivet type fasteners that can be released for removal and re-use.

BACKGROUND OF THE INVENTION

Various types of push-in fasteners have been used for engagement in holes of work pieces, to fasten together adjacent panels, or secure objects on the work piece. In a simple form for such a fastener, the work piece is provided with a hole. The fastener includes a head and a shank. The head is sized larger than the hole, so that the head will not pass into or through the hole. The shank includes outwardly biased but yieldable segments, frequently having an inwardly angled tapered tip. The expanded portion of the shank is nominally larger than the hole. Securing the fastener in the work piece is achieved by forcing the shank into the hole. As the shank enters and slides through the hole, the outwardly biased yet yieldable portions move slightly inwardly to allow full insertion of the fastener, until the head engages a surface of the work piece first entered by the fastener. A segment of the shank extends through the hole in the work piece. Due to the shape of the shank and the structure of the shank segments controlling the degree to which each can yield or deflect, withdrawal of the shank from the aligned apertures can be made difficult or prevented. A disadvantage of this type of fastener is that the insertion pressure required to cause the shank segments to yield may be disadvantageously high if the outward biasing force of the segments is sufficient to inhibit or prevent subsequent withdrawal of the fully inserted fastener.

In another type of fastener, the shank includes a hollow core accessed through an opening in the head. A pin is provided. After the shank has been fully inserted, the pin is driven into the core of the shank, thereby urging the shank outwardly and securing the fastener in the hole of the work piece. Two-part fasteners of this type have disadvantages in that the parts can become separated from each other. Proper insertion of the pin into the shank may be troublesome if the access area is limited, or the individual using the fastener does not have sufficient dexterity to handle significantly small pins.

A fastener with a retained movable pin is shown in U.S. Pat. No. 6,074,144. A disadvantage of this design is that multiple steps are required to pre-assemble the fastener before actual use. The pin must be positioned in a pre-locking position after initial molding of the fastener.

Similar structures can be used as a fastening base or anchor on the surface of a work piece, rather than as a fastener joining two work pieces. The fastener is inserted in a work piece, and carries a superstructure on the surface of the work piece. The superstructure is configured for the attachment thereto of another work piece, covering or the like. It would be advantageous in many such applications if the fastener were easily removable and reusable.

What is needed in the art is a self-locking rivet type fastener that includes a pre-lock configuration in which the shank is readily inserted into a hole, with minimal insertion pressure. What is further needed is a self-locking type rivet fastener that expands automatically as part of the insertion process, and that is locked into place upon full insertion. Further what is needed is a releasable type rivet fastener easily used and securely positioned, yet releasable for removal and re-use.

SUMMARY OF THE INVENTION

The present invention provides a rivet-type fastener for securing within a hole of a work piece. The structure of the fastener causes automatic expansion of the fastener as the fastener is inserted in the hole, and engages locking members to secure the fastener in the hole.

In one aspect thereof, the invention provides a fastener for a work piece with a base and first and second arms attached to the base and extending outwardly therefrom. The first and second arms each include proximal segments and distal segments conjoined at ends thereof. A post extends inwardly between the arms, from the conjoined distal segments toward the base. The arms and the post have cooperating structures for spreading the arms and locking the arms in a spread position, as relative axial movement occurs between the arms and the post.

In another aspect of the invention, a fastener is provided with a base having a surface defining a channel, and opposed arms joined to the base in spaced relation on opposite sides of the channel. The arms include distal segments. A post is joined to the distal segments of the arms and extends between the arms towards the base. The post includes a transverse bar between the arms and aligned with the channel. Lateral protrusions extend outwardly from the post, and have tips. Notches in the arms engage the tips of the lateral protrusions in a locked position.

In still another aspect thereof, the invention provides a rivet-style fastener with a base having a surface defining a channel. First and second opposed arms are joined to the surface of the base, in spaced relation to each other, and on opposite sides of the channel. The arms include relatively thicker proximal segments and relatively thinner distal segments. A post is joined to the distal segments and extends between the arms towards the base. The post includes a transverse bar between the arms and aligned with the channel. The bar has a length greater than the width of the hole. Lateral protrusions extend outwardly from the post, and have wedge surfaces ending at protrusion tips. Notches are provided in the proximal segments for engaging the tips of the lateral protrusions. Ramp surfaces on the arms direct the tips from the unlocked position to a locked position in which the tips are engaged by the notches, and the arms are deflected outwardly.

An advantage of the present invention is providing a unitary rivet-style fastener, with automatic locking structures activated upon insertion of the fastener in a work piece.

Another advantage of the present invention is providing a fastener for a hole in a work piece that locks during insertion and can be unlocked for removal and re-use.

Other features and advantages of the invention will become apparent to those skilled in the art upon review of the following detailed description, claims and drawings in which like numerals are used to designate like features.

Figure 1:
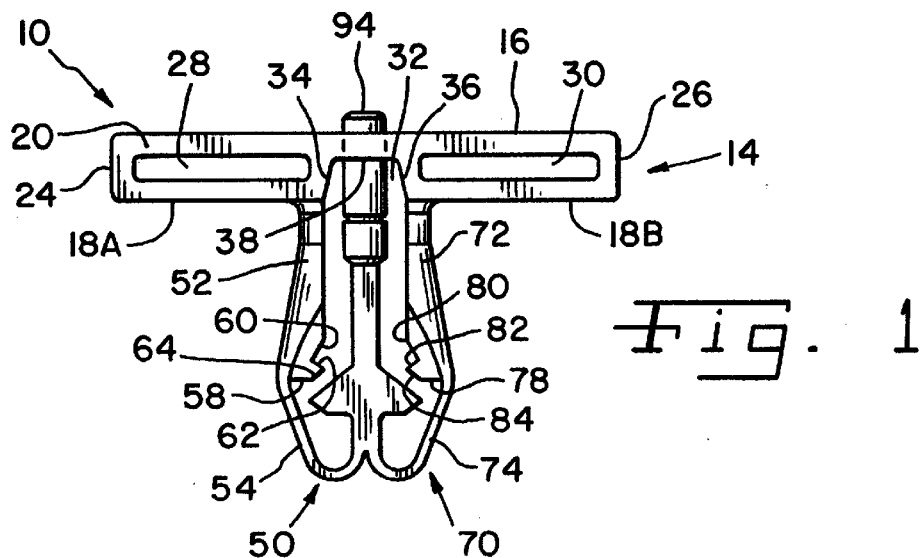
FIG. 1 is an elevational view of a self-locking rivet fastener according to the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENT

Figure 4:
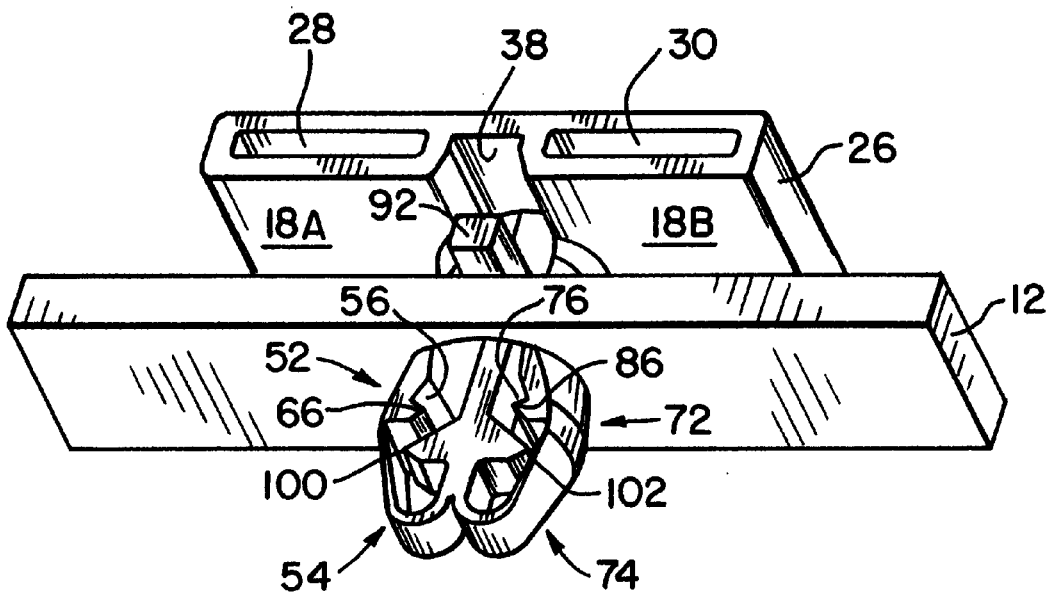
FIG. 4 is a perspective view of the fastener shown in FIG. 3, illustrating partial insertion of the fastener in a work piece.
Figure 5:
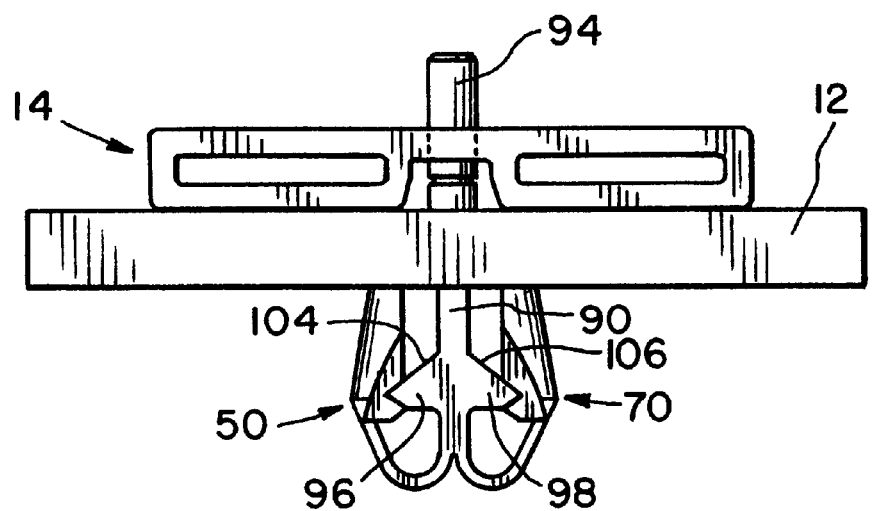
FIG. 5 is an elevational view similar to FIG. 1, but illustrating full insertion of the fastener in the work piece.

Referring now more specifically to the drawings, and to FIG. 1 in particular, numeral 10 designated a fastener of the present invention. Fastener 10 is useful in fastening together adjacent panels (not shown) having apertures therethrough. Fastener 10 also may be used as an anchor to which other structures can be secured, in which case fastener 10 can be inserted in a single work piece 12, as shown in FIGS. 4 and 5.

Fastener 10 includes a base 14 that may be of a variety of shapes and configurations, depending on the application of and use for fastener 10. FIG. 5 illustrates fastener 10 in a vertical orientation in work piece 12, with base 14 above work piece 12; however, it should be understood that fastener 10 also can be used in applications wherein base 14 is below, along side or oriented angularly with respect to work piece 12. Terms such as "top", "bottom", "up", "down" and variations thereof are used herein for ease in description only, and are used with respect to the orientation of the various views in the drawings. Thus, the terms are not to be understood as limitations on the orientation of fastener 10, or how it may be used.

In the embodiments illustrated, base 14 is a substantially flat, rectangular, plate-like structure having a top surface 16, a bottom surface 18, side surfaces 20 and 22 and end surfaces 24 and 26. While base 14 is illustrated to be rectangular in the drawings, base 14 could be of other shapes. Additionally, for fastening purposes, top surface 16 can carry a variety of superstructures and fastening components, as necessary. As illustrated in FIGS. 1 through 5, base 14 includes a pair of slots 28 and 30 extending therethrough, from side surface 20 to side surface 22, intermediate top and bottom surfaces 16 and 18. Slots 28 and 30 can be used, for example for receiving tabs from panels or other components hung on or secured to fastener 10.

Bottom surface 18 defines a rectangular channel 32 having channel sides 34 and 36 and a channel floor 38. Channel sides 34 and 36 angle outwardly from channel floor 38, so that the opening to channel 32 is wider than channel floor 38. Channel 32 extends between side surfaces 20 and 22 and separates bottom surface 18 into bottom surface segments 18A and 18B. Depending on the size, shape, application and use of base 14, channel 32 may be disposed intermediate side surfaces 20 and 22 or end surfaces 24 and 26, perpendicular thereto or at an angle, and in shapes other than the rectangular shape shown. An aperture 40 is formed in base 14, having openings in and extending from channel floor 38 to top surface 16.

First and second arms, designated 50 and 70 respectively, are connected to base 14 and extend outwardly from bottom surface 18 on opposite sides of channel 32. When viewed from either side of fastener 10, arms 50 and 70 are mirror images of each, being similarly shaped and oppositely directed so as to face each other. Arms 50 and 70 have relatively thicker proximal segments 52 and 72 nearest base 14, and relatively thinner distal segments 54 and 74 furthest from base 14. Proximal segments 52 and 72 angle outwardly, slightly, from base 14. When viewed in side elevation as shown in FIG. 1, arms 50 and 70 define a slight pear shape, in the unlocked position of fastener 10, as shown. A wider middle is provided near the junction of proximal segments 52 and 72 with distal segments 54 and 74, and narrower ends both at base 14 and distal segments 54 and 74.

Proximal segments 52 and 72 define notches 56 and 76, respectively, generally aligned with and facing each other near ends 58 and 78 of proximal segments 52 and 72, joining distal segments 54 and 74, respectively. Notches 56 and 76 are defined by intersecting walls 60, 62 and 80, 82 respectively. Ramps 64 and 84 extend from ends 58 and 78, respectively, each angling inward and toward base 14, intersecting with walls 62 and 82 of notches 56 and 76, and forming lips 66 and 86, respectively.

Figure 2:
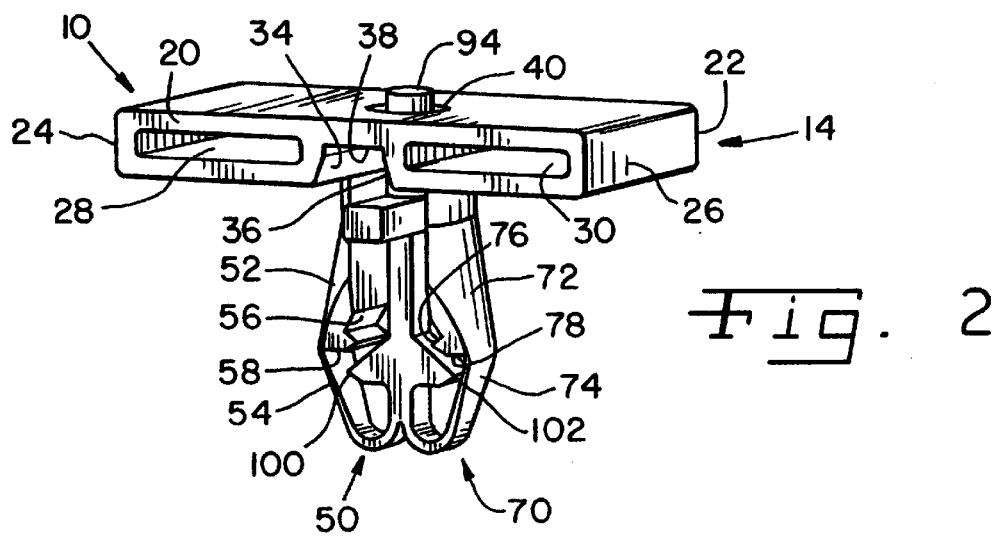
FIG. 2 is a perspective view of the fastener shown in FIG. 1.
Figure 3:
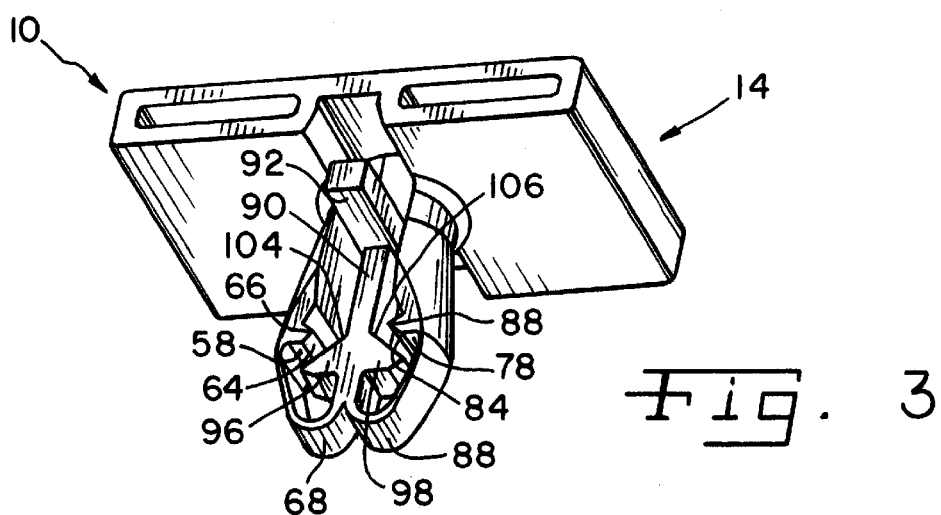
FIG. 3 is a perspective view of the fastener shown in FIGS. 1 and 2, but showing the lower side of the fastener from that shown in FIG. 2.

Distal segments 54 and 74 extend from proximal segments 52 and 72, respectively, curving inwardly toward each other and forming loops 68 and 88, respectively, conjoined at a post 90. Loops 68 and 88 are pliable, accommodating deformation thereof, to enable relative axial movement between post 90 and proximal segments 52 and 72. Post 90 extends from conjoined distal segments 54 and 74 toward base 14, between arms 50 and 70. A transverse bar 92 is provided at the top of post 90, bar 94 being aligned with channel 32, but spaced therefrom in an unlocked, relaxed condition of fastener 10, as shown in FIGS. 1–3. Bar 92 is.sufficiently long to extend beyond the widths of arms 50 and 70. The width of bar 92 is less than the opening to channel 32, so that bar 92 will fit in channel 32, against channel floor 38. In the embodiment of fastener 10 shown in FIGS. 1–5, a pin 94 extends from bar 92 through aperture 40, terminating slightly beyond top surface 16.

First and second protrusions 96 and 98 project laterally from post 90, and have outer tips 100 and 102, shaped to be received in notches 56 and 76, respectively. Protrusions 96 and 98 have wedge surfaces 104 and 106, respectively, that extend angularly from tips 100 and 102, both inwardly toward post 90 and upward toward bar 92.

In the use of fastener 10, a hole is provided in work piece 12 sufficiently wide for arms 50 and 70 to be pushed therethrough, but sufficiently narrow that the fit of arms 50 and 70 is snug, with some resistance. The insertion of fastener 10 is commenced with fastener 10 in a relaxed, unlocked position as shown in FIGS. 1–3. The width of the hole in work piece 12 can be slightly smaller than the widest dimension defined by arms 50 and 70. However, the hole should be greater than the dimension defined between tips 100 and 102, and the thickness of distal segments 52 and 72 in the region of protrusions 96 and 98. The space between arms 50 and 70, and the widths thereof can be such that a round hole can be provided in work piece 12, or the configuration may be such as to require an oblong hole or other shape. With fastener 10 properly oriented in work piece 12, the hole in work piece 12 directly beneath bar 92 is narrower than the length of bar 92.

Loops 68 and 88 are placed in the hole of work piece 12. As force is applied, and fastener 10 is advanced in the hole, proximal segments 52 and 72 encounter the side of the hole in work piece 12. With additional insertion force applied to base 12, arms 50 and 70 deflect slightly inward, until the widest portion thereof passes through the hole. The gently curving shape of the outer surfaces of arms 50 and 70 cause the inward deflection of arms 50 and 70 to occur smoothly and easily. After the widest portions thereof pass through the hole in work piece 12, arms 50 and 70 spring outwardly.

At about the same position, bar 92 will come to rest against work piece 12, without advancing through the hole in work piece 12 due to the length of bar 92. Continued insertion of fastener 10 occurs without further movement of post 90. As proximal segments 52 and 72 are pushed further into work piece 12, loops 68 and 88 begin to flatten, and ramps 64 and 84 come into contact with wedge surfaces 104 and 106 respectively. Sliding movement of ramps 64 and 84 against wedge surfaces 104 and 106 causes spreading between proximal segments 52 and 72 near ends 58 and 78.

Bar 92 enters channel 32 as bottom surface 18 approaches work piece 12, so that bottom surface 18 can rest flush against work piece 12. The outward tapers of channel sides 34 and 36 direct bar 92 to the bottom of channel 32, against channel floor 38. When fastener 10 is fully inserted and locked, bar 92 is secured in channel 32, between channel floor 38 and work piece 12.

As bar 92 comes to rest against channel floor 38, tips 100 and 102 of protrusion 96 and 98 slide past lips 66 and 86, lodging in notches 56 and 76, respectively. Arms 50 and 70 are sufficiently spread to prevent withdrawal of fastener 10 from the hole in work piece 12. With protrusions 96 and 98 lodged between arms 50 and 70, inward deflection of arms 50 and 70 is inhibited. Thus, fastener 10 is locked in work piece 12, and can not be withdrawn easily.

An advantage of the present invention, in some embodiments thereof, is that fastener 10 can be unlocked and withdrawn. From the locked position shown in FIG. 5, axial pressure is applied to pin 94. Tips 100 and 102 are forced downwardly, past lips 66 and 86, thereby unlocking the fastener. Only minimal distortion of tips 100 and 102, and/or of lips 66 and 86 is required to dislodge tips 100 and 102 from notches 56 and 76, thereby unlocking fastener 10. The fastener can then be pulled outwardly from work piece 12.

Figure 6:
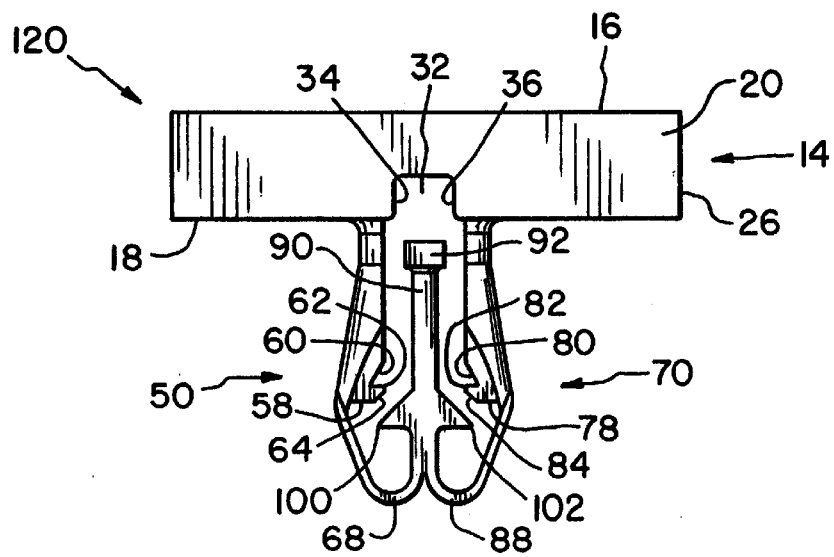
FIG. 6 is an elevational view of a second embodiment of the fastener according to the present invention.
Figure 7:
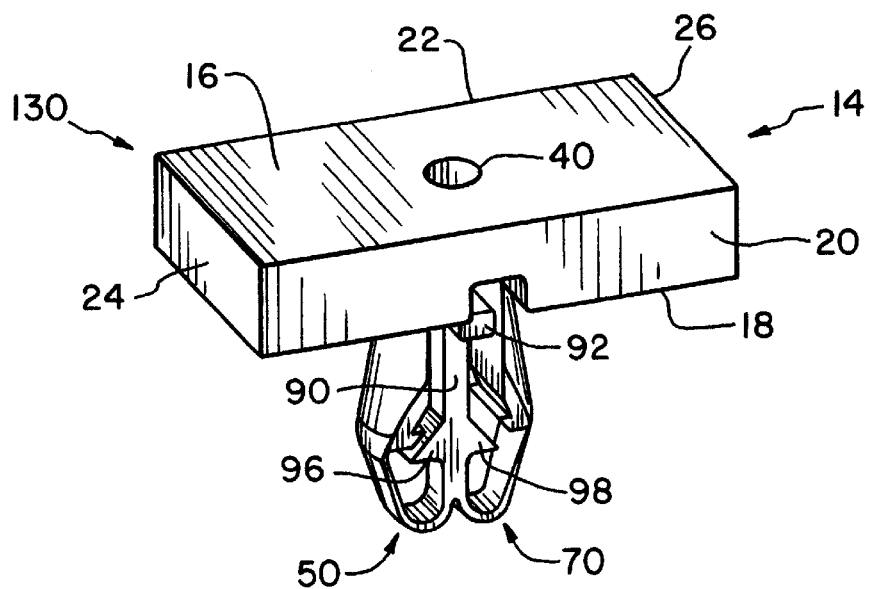
FIG. 7 is a perspective view of yet another embodiment of the fastener according to the present invention.

The self-locking feature of the present invention can be used advantageously without the unlocking feature of the invention. FIG. 6 illustrates a second embodiment 120 of the invention that does not include aperture 40, or pin 94 extending from bar 92. Further, the present invention can be made unlockable without pin 94. FIG. 7 illustrates a third embodiment 130 that includes aperture 40, as described previously, without pin 94 extending therethrough from bar 92. To unlock third embodiment 130, an awl, punch or similar probe-like instrument is inserted through aperture 40 against bar 92. Continued pressure from the instrument against bar 92 provides the aforedescribed unlocking by dislodging tips 100 and 102 from notches 56 and 76.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener for a work piece, comprising:
    a base;
    first and second arms attached to said base and extending outwardly therefrom, said first and second arms each including proximal segments facing each other in spaced relation and distal segments conjoined at ends thereof;
    a post extending inwardly between said arms, from said conjoined distal segments toward said base, said post being spaced a distance from said base when said fastener is in an unlocked, relaxed condition;
    said arms and said post having cooperating structures for spreading said arms and locking said arms in a spread position, as relative axial movement occurs between said arms and said post.

2. The fastener of claim 1, said arms defining notches, and said post including laterally extending protrusions engaged by said notches for locking said arms in said spread position.

3. The fastener of claim 2, said protrusions and said arms having cooperating angular surfaces for spreading said arms by said relative axial movement between said arms said post.

4. The fastener of claim 1, said first and second arms each including a relatively thicker proximal segment and a relatively thinner distal segment.

5. The fastener of claim 4, said proximal segments of said first and second arms defining notches therein, and said post including laterally extending protrusions received in said notches for locking said arms in said spread position.

6. The fastener of claim 5, said proximal segments each including a ramp surface angling toward said base and inwardly toward said post.

7. The fastener of claim 6, said lateral protrusions each including a wedge surface angling away from said base and toward said arms.

8. The fastener of claim 7, said distal segments defining pliable loops.

9. The fastener of claim 7, said base defining a transverse channel between said arms, and said post including a bar aligned with said channel.

10. The fastener of claim 9, said arms having a width, and said bar having a length longer than said width.

11. The fastener of claim 9, said base defining an aperture extending therethrough from said channel.

12. The fastener of claim 11, said post including a pin extending from said bar through said aperture in said base.

13. A fastener comprising:
    a base having a surface defining a channel;
    opposed arms joined to said base in spaced relation on opposite sides of said channel, said arms including distal segments;
    a post joined to said distal segments of said arms and extending between said arms towards said base, said post including a transverse bar between said arms and aligned with said channel;
    lateral protrusions extending outwardly from said post, said protrusions having tips; and notches in said arms for engaging said tips of said lateral protrusions in a locked position.

14. The fastener of claim 13, said base having an aperture therethrough communicating with said channel.

15. The fastener of claim 14, said post further including a pin extending from said bar through said aperture.

16. The fastener of claim 13, said lateral portions having wedge surfaces angling outwardly from said post and downwardly from said bar.

17. The fastener of claim 16, said arms each including a proximal segment defining said notch and a ramp surface extending upwardly and inwardly to define a lip leading into said notch.

18. The fastener of claim 13, said bar extending laterally from said post between said arms and outwardly beyond said arms.

19. A rivet fastener to be secured in a hole of a work piece, the hole having a hole width, said fastener comprising:

a base having a surface defining a channel, said base being larger than the hole in the work piece;

first and second opposed arms joined to said surface of said base in spaced relation to each other, and on opposite sides of said channel, said arms including relatively thicker proximal segments and relatively thinner distal segments, said arms having an unlocked configuration in which said arms can be inserted through the hole of the work piece;

a post joined to said distal segments and extending between said arms towards said base, said post including a transverse bar between said arms and aligned with said channel, said bar having a length greater than the width of the hole;

lateral protrusions extending outwardly from said post, said protrusions having wedge surfaces ending at protrusion tips; and notches in said proximal segments for engaging said tips of said lateral protrusions, and ramp surface on said arms directing said tips from the unlocked position to a locked position in which said tips are engaged by said notches, and said arms are deflected outwardly.

20. The rivet fastener of claim 19, said base including a top surface and a bottom surface, said channel being in said bottom surface, and an aperture in said base, extending from said channel to said top surface.

* * * * *